July 16, 1929.  R. B. GIBSON  1,720,832
WINDSHIELD WIPER
Filed April 26, 1928
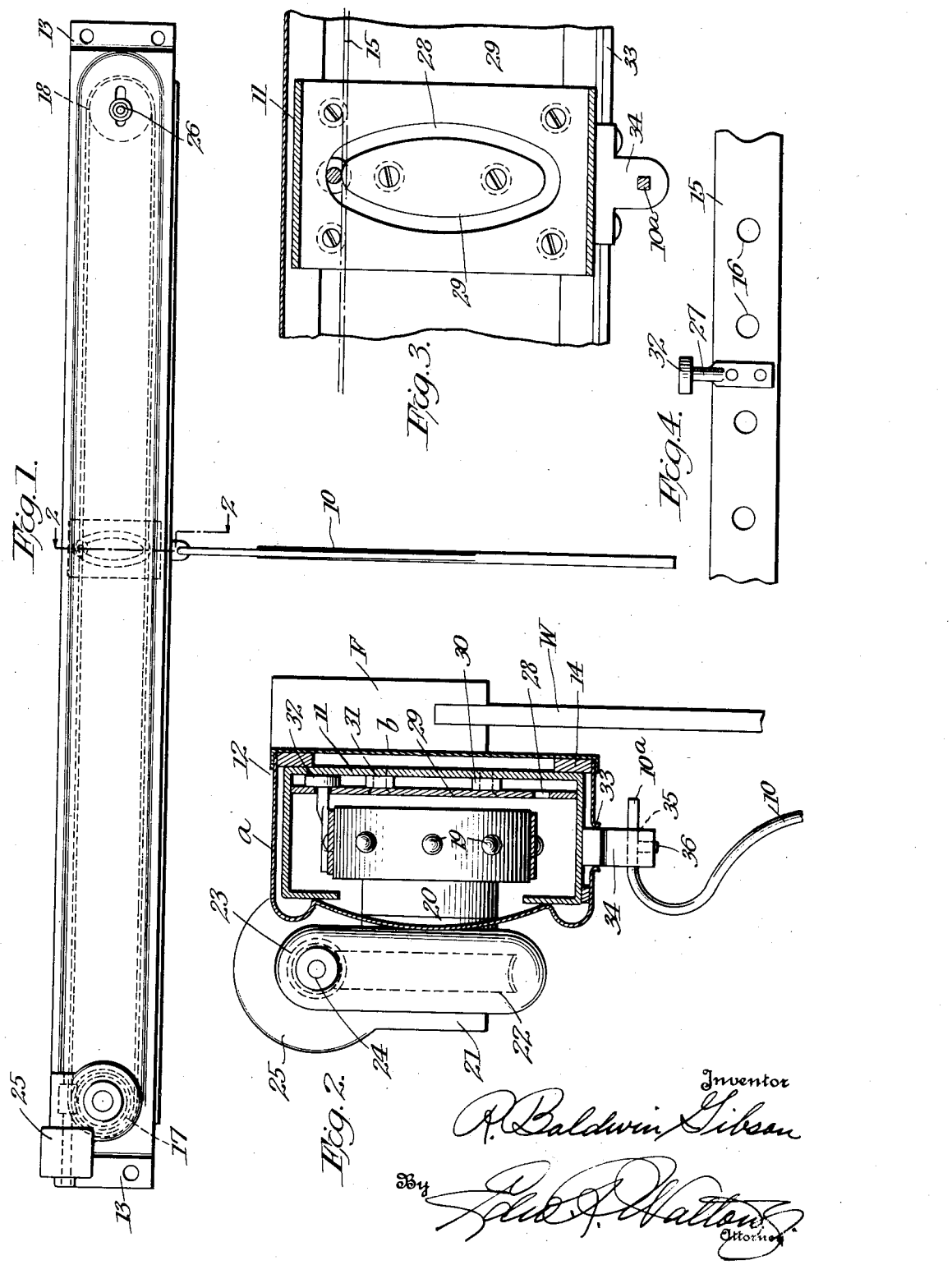

Patented July 16, 1929.

1,720,832

UNITED STATES PATENT OFFICE.

RAYMOND BALDWIN GIBSON, OF DETROIT, MICHIGAN.

WINDSHIELD WIPER.

Application filed April 26, 1928. Serial No. 273,064.

The present invention is a wind shield wiper of the type which reciprocates transversely across the wind shield, and which is power operated.

The object of the invention is to improve wind shield wipers of the above stated character by simplifying their construction and reducing their cost of production, yet providing a more durable construction and more efficient device.

A further object of the invention is to provide a wind shield wiper of the above stated character, where there will be a greater throw of the wiper to the side edges of the wind shield; and also where the wiper per se may be adjusted toward and away from the surface of the wind shield.

Other objects and features of the invention reside in the novel detailed construction, combination and arrangement of parts hereinafter more fully described in the appended claims.

In this specification and the annexed drawings, the invention is disclosed in the form in which it is considered to be the best, but the invention is not limited to such form because it is capable of being embodied in other forms, and it is to be understood that in and by the claims following the description herein it is intended to cover the invention in whatever form it may embody within the scope thereof.

In the drawings which show the preferred embodiment of the invention as at present devised, Figure 1 is a front elevation of the wind shield wiper, its operating parts which are enclosed within the casing being generally indicated by dotted lines;

Figure 2 is a transverse sectional view taken substantially on line 2—2 of Fig. 1 and looking in the direction of the arrows, and illustrating the wiper applied to the wind shield;

Figure 3 is a vertical sectional view taken on line 3—3 of Fig. 2; and

Figure 4 is a fragmentary plane view of the operating belt or band.

Referring in detail to the drawings the wiper per se is indicated by the numeral 10 and is of ordinary construction commonly used, that is, consisting of an arm having a strip or strips of suitable material such as rubber, felt or the like which is brought into contact with the surface of the wind shield W. The wiper 10 is reciprocated back and forth by a carriage 11 suitably housed and mounted in a casing 12. The casing 12 is here shown as an elongated tubular member, preferably rectangular in cross section and is of a length sufficient to extend across the entire width of the wind shield. The casing may be made of two sections *a* and *b* so as to enable the assemblage of parts, the end portions of the part *b* having outwardly extending flanges 13 having suitable openings therein through which screws or bolts may extend for securing the device to the wind shield frame F or other suitable portion of the vehicle.

The carriage 11 is shaped to conform substantially to the interior of the housing 12 and has strips or blocks of anti-frictional material 14, as fiber, Babbitt metal or the like at the points indicated to bear against the interior wall of the housing, whereby the carriage is prevented from shifting laterally or vertically, however, it is free to easily reciprocate therein along the length thereof.

The carriage is reciprocated by an endless band 15 preferably of flexible metal having spaced perforations 16 therein. The band extends around a drive wheel 17 and an idler wheel 18 mounted respectively in opposite ends of the housing 12. These wheels preferably have their peripheral surfaces covered with cork, rubber, or other suitable material for the purpose of reducing noise; and the drive wheel 17 is provided with spaced peripheral projections 19 which engage and extend through the opening 16 of the belt, whereby the latter is positively driven. The wheel 17 is carried by a shaft 20 mounted in a bearing 21, the shaft 20 also carrying a worm wheel 22 which meshes with a worm 23 on the motor shaft 24. The motor, which is preferably but not necessarily electrical, is enclosed within a suitable housing 25. For the purposes of the present showing the bearing 21 is illustrated as being a part of the motor housing.

However, the bearing may be mounted directly on the casing 12. While an electric motor is shown and described any other suitable type of motive power may be substituted. The idler wheel 18 has its shaft 26 mounted in longitudinal slot *c* in the casing 12 so that the shaft may be adjusted therein to take up any slack that may occur in the belt 15.

As illustrated in the drawings the carriage embraces the belt 15 and has a rigid projection 27 thereon which extends into an elliptical shaped race or slot 28 formed in a plate 29, preferably of fibrous material. This plate 29 is spaced from the rear wall of the carriage 11 by suitable spacing elements 30, and is held in rigid and fixed relation therewith by screws 31. A projection 27 has an enlarged head 32 on its outer end to prevent the accidental displacment of the projection from the race, the head occupying the space between the plate 29 and the adjacent wall of the carriage 11.

The carriage 11 being channel shaped is so positioned that the opened side thereof will provide a passageway through which the bushing 20 and shaft 26 of the wheels 17 and 18, respectively, may pass, thereby ensuring the operation of the device as the projection 27 is carried around the periphery of the wheels and moved in the race or slot 28. By reason of the elliptical shape of the slot 28 the pin 27 will move in a rotary manner with respect to the carriage and will not cause any binding, jerk or unevenness in the reciprocation of the wiper 10 as the projection 27 moves about the periphery of either the wheels 17 or 18.

The lower wall of the casing 12 is provided with an elongated slot 33 through which the projection 34 extends. This projection is secured to the lower wall of the carriage 11 and has its outer end provided with a lateral or horizontal opening 35, which is positioned to extend at right angles with respect to the plane of the wind shield W to receive a lateral projection 10ª of the wind shield arm 10, as clearly shown in Fig. 2. The projection 10ª may be of desired length and is held in adjusted position within the opening 35 by a binding screw 36. This construction permits the wiper member arm 10, which is usually of resilient material, to be adjusted toward and away from the wind shield as desired in order to exert the pressure necessary against the wind shield for successful operation of the wiper.

From the above it will be manifest that a very practical and efficient construction of wind shield wiper has been provided. While the motor 25 is shown at the right end of the wiper, this is optional as it may be placed at either end or may be arranged to extend within the car. Furthermore, the present construction is susceptible of duplication in so far as two wipers may be connected with the apparatus, one to operate on the inside of the wind shield and the other on the outside of the wind shield, and to be operated by one or separate motors.

Having thus described the invention what is claimed is:

1. A wind shield wiper comprising a wiping element, an elongated casing, a carriage mounted within the casing to reciprocate therein and connected with said wiper, said carriage being channel shaped and in slidable contact with the inner walls of the casing, pulley wheels mounted within said casing, an endless band passing over said pulley wheels and actuated by at least one of said wheels and a projection extending from said band into a slot in said carriage, the open side of said channel shaped carriage providing passage through which bearings of said wheels may pass.

2. A wind shield wiper comprising a wiping element, an elongated casing, a carriage mounted within the casing and in slidable contact with the walls of the casing whereby the carriage is reciprocably supported within the casing, pulley wheels mounted within said casing and having spaced peripheral pins thereon, an endless band passing over said pulley wheels, said band having spaced openings therein to receive said pins or the pulleys and being actuated by at least one of said wheels, said carriage being channel shaped and embracing said band, and a projection extending from said band into a slot in said carriage, the open side of said channel shaped carriage providing passage through which bearings of said wheels may pass, said wiping element being connected with said carriage.

3. A wind shield wiper comprising a wiping element, an elongated casing, a carriage mounted within the casing and in slidable contact with the walls of the casing to reciprocate therein, pulley wheels mounted within said casing, an endless band passing over said pulley wheels and actuated by at least one of said wheels, said carriage being channel shaped and embracing said band, and a projection extending from said band, a removable plate within said carriage and spaced from one wall thereof and having an endless slot therein through which said projection extends, the open side of said channel shaped carriage providing a passage through which bearings of said wheels may pass, said wiping element being connected with the carriage.

4. A wind shield wiper comprising a wiping element, an elongated casing, a carriage mounted within the casing and in slidable contact with the walls of the casing to reciprocate therein, pulley wheels mounted within said casing, an endless band passing over said pulley wheels and actuated by at least one of said wheels, said carriage being channel shaped and embracing said band, and a projection extending from said band, a removable plate within said carriage and spaced from one wall thereof and having an elliptical slot therein through which said projection extends, the open side of said channel shaped carriage providing a passage through which bearings of said wheels may pass, said casing having a slot in the bottom wall thereof, an extension on the carriage projecting the slot in said casing and having an opening therein to extend at right angles to the plane of a wind shield, a lateral extension on the wiping member slidably mounted in said opening, and means for adjustably securing said wiper extension in said opening.

5. A wind shield wiper comprising an elongated casing, a carriage reciprocably mounted within the casing, a wiping element positioned exteriorly the casing and having connection with said carriage, pulley wheels mounted within the casing adjacent opposite ends thereof and having spaced pins projecting from the periphery thereof, an endless metal band passing over and in contact with the periphery of said pulleys and having openings therein to receive said pins on the pulleys, said band having connection with said carriage whereby the latter is reciprocated.

6. A wind shield wiper comprising an elongated casing, a carriage reciprocably mounted within the casing, a wiper element positioned exteriorly of the casing and having connection with said carriage, pulleys mounted within the casing adjacent the ends thereof, an endless band passing over said pulleys and actuated by one of said pulleys, said carriage having an endless slot therein, and a projection on said band extending through said endless slot, whereby the carriage is reciprocated.

7. A wind shield wiper comprising a wiping element, an elongated casing, a carriage mounted within the casing and in slidable contact with the walls of the casing to reciprocate therein, pulley wheels mounted within said casing, an endless band passing over said pulley wheels and actuated by at least one of said wheels, said carriage being channel shaped and embracing said band and a projection extending from said band, a removable plate within said carriage and spaced from one wall thereof and having an elliptical slot therein through which said projection extends, the open side of said channel shaped carriage providing a passage through which bearings of said wheels may pass, said casing having a slot in the bottom wall thereof and means extending through said slot connecting said wiper element with said carriage.

In testimony whereof I have hereunto set my hand.

R. BALDWIN GIBSON.